D. CAINE.
MACHINE FOR SOWING FERTILIZERS AND SEEDS.

No. 78,423. Patented June 2, 1868.

Witnesses:
Chester Chilson
Otto L. Johnson

Inventor:
Daniel Caine

United States Patent Office.

DANIEL CAINE, OF BATTLE CREEK, MICHIGAN.

Letters Patent No. 78,423, dated June 2, 1868.

IMPROVED MACHINE FOR SOWING FERTILIZERS AND SEEDS.

*The Schedule referred to in these Letters Patent and making part of the same.*

TO ALL WHOM IT MAY CONCERN:

Be it known that I, DANIEL CAINE, of the city of Battle Creek, in the county of Calhoun, and State of Michigan, have invented certain new and useful Improvements in Machines for Sowing Plaster or other Fertilizing-Material, and Clover or other Seed; and I do hereby declare that the following is a full, clear, and exact description of the construction and operation of the same, reference being had to the annexed drawings, and letters of reference, forming a part of this specification, in which—

Figure 1 is a side elevation, broken through.

Similar letters of reference indicate like parts in both figures.

My invention relates to an arrangement of parts for agitating or pulverizing the plaster or other fertilizing-material, and mixing it evenly with the seed in a single hopper while being sown, in connection with devices for keeping the apertures of discharge free from all obstructions; and to better enable others skilled in this branch of mechanism to construct my invention, I will proceed to describe it, in connection with an attachment for raking in the seed.

A represents a long hopper, of ordinary construction, of sloping side-boards, $a$, nailed to the ends, but without a bottom, and furnished at each end with a square eye, projecting below, to receive the bearing-boxes of a feed-roller, R, to be presently described.

Figure 1:
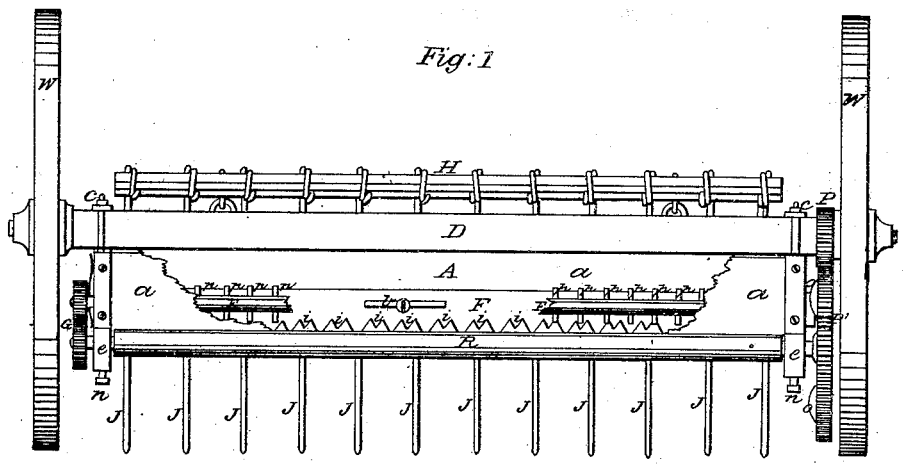
Figure 2:
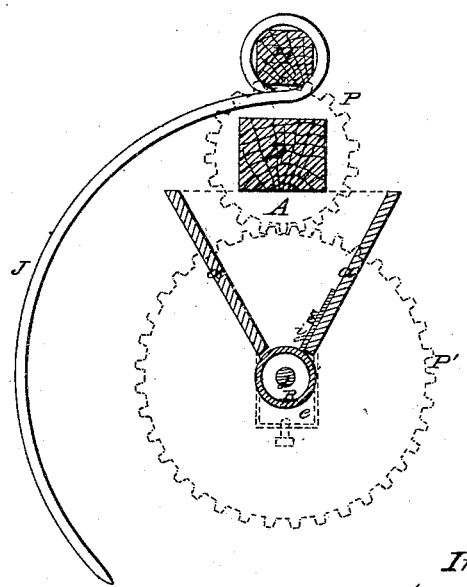
Figure 2 is a cross-section.

I usually form this eye, $e$, and strengthen the hopper at the same time, by means of band-iron, continued up and screwed to the sides, and bent square, as seen by dotted lines in fig. 2, or semicircular, as may be deemed best.

I clamp the ends of the hopper by clamping-bolts, as at $c$, to the under side of any suitable axle-tree, D, carrying a pair of traction-wheels, W.

The mode which I employ to incorporate and mix the seed and plaster, or gypsum, ashes, &c., in the hopper, and to sow the mixture fairly and equally, so that it is distributed evenly over the ground, is by the combined operation of a revolving stirrer, E, a reciprocating serrated clearer, F, and feeding-roller R.

The stirrer is substantially the same as those in general use for the purpose, being simply a wooden shaft, provided with any desired number of rows (I find two sufficient) of iron pins, $p$, and hung low down in the hopper.

I usually construct the feed-roller R of a piece of iron boiler-tube, and insert the journals $j$ in plugs in the ends, said journals working in half boxes, fitted in the eyes $e$ aforesaid. This roller forms the bottom to the hopper, being hung so as to revolve as close as practicable, without touching the lower edge of the non-feeding side of the hopper, and to leave just space between, on the other side, to permit the contents to pass between, in the direction of the roller's motion.

The feed-roller R is driven by a spur-pinion on one of the wheel-hubs, at P, gearing into an overhanging-wheel, P', on one end of the roller; motion being communicated to the stirrer-shaft by the gears G at the opposite end.

F, representing the clearer, is a plate of sheet metal, serrated, as seen, on the lower edge, and resting on the feed-roller and against the feeding-side of the hopper. It works through slots or gains cut in the hopper-heads previous to nailing; and I usually confine it from springing in the centre by one or more slots and screws, as seen at $b$, but so as to permit free longitudinal motion back and forth, which motion is effected by the cam-like projections $o$ cast on the wheel P', and by a stiff spring, $s$, on the opposite end of the hopper.

Each alternate tooth of the clearer is bent upward, as at $i$; and to save friction, I usually flatten a little the points of the unbent ones traversing the feed-roller.

For the purpose of raking in the seed as it is sown, and save harrowing, I hang, by eye-bolts and staples, or in any other suitable way, to the top of the axle, (carrying a hopper, as described,) a wooden bar, H, carrying a series of wire rake-teeth, J, curved substantially as shown, so as to reach to the ground. This rake may operate in very friable ground by its weight alone, or its force of depression may be graduated by a lever, springs, or any of the well-known devices in common use, for analogous purposes.

My arrangement for mixing and sowing plaster and clover-seed may very readily be employed in temporary connection with any suitable hay-raking machine, and thus save the expense of a complete machine for each special purpose.

The discharge-slit or space between the feed-roller and hopper may be graduated all that is necessary by set-bolts, as at $n$.

The operation is as follows:

As the machine is drawn along on its wheels, the pinion P communicates a revolving motion to the stirrer E and feeding-roller R, and a reciprocating rectilinear motion to the serrated clearer F, as previously described. The pins on the stirrer-shaft keep the plaster friable and well mixed with the seed as they turn; but it is the special function of the clearer to keep the mixed contents loose at the delivery, and agitate, by means of the bent teeth, any unbroken lumps, back and forth; so as to permit the pulverized plaster and seed to pass unobstructed between the straight teeth, through the narrow discharge-space between the said feed-roller and lower edge of the hopper-side, and fall to the ground, when it is raked in by the rake-teeth J.

Having described my invention, what I claim as new, and desire to secure by Letters Patent, is—

The hopper A, in combination with the stirrer E, clearer F, and feeding-roller R, arranged relatively with each other and with an axle, D, and wheels W, and constructed and operated substantially in the manner and for the purpose as set forth.

DANIEL CAINE.

Witnesses:
CHESTER CHILSON,
OTTO L. JOHNSON.